Patented Apr. 27, 1943

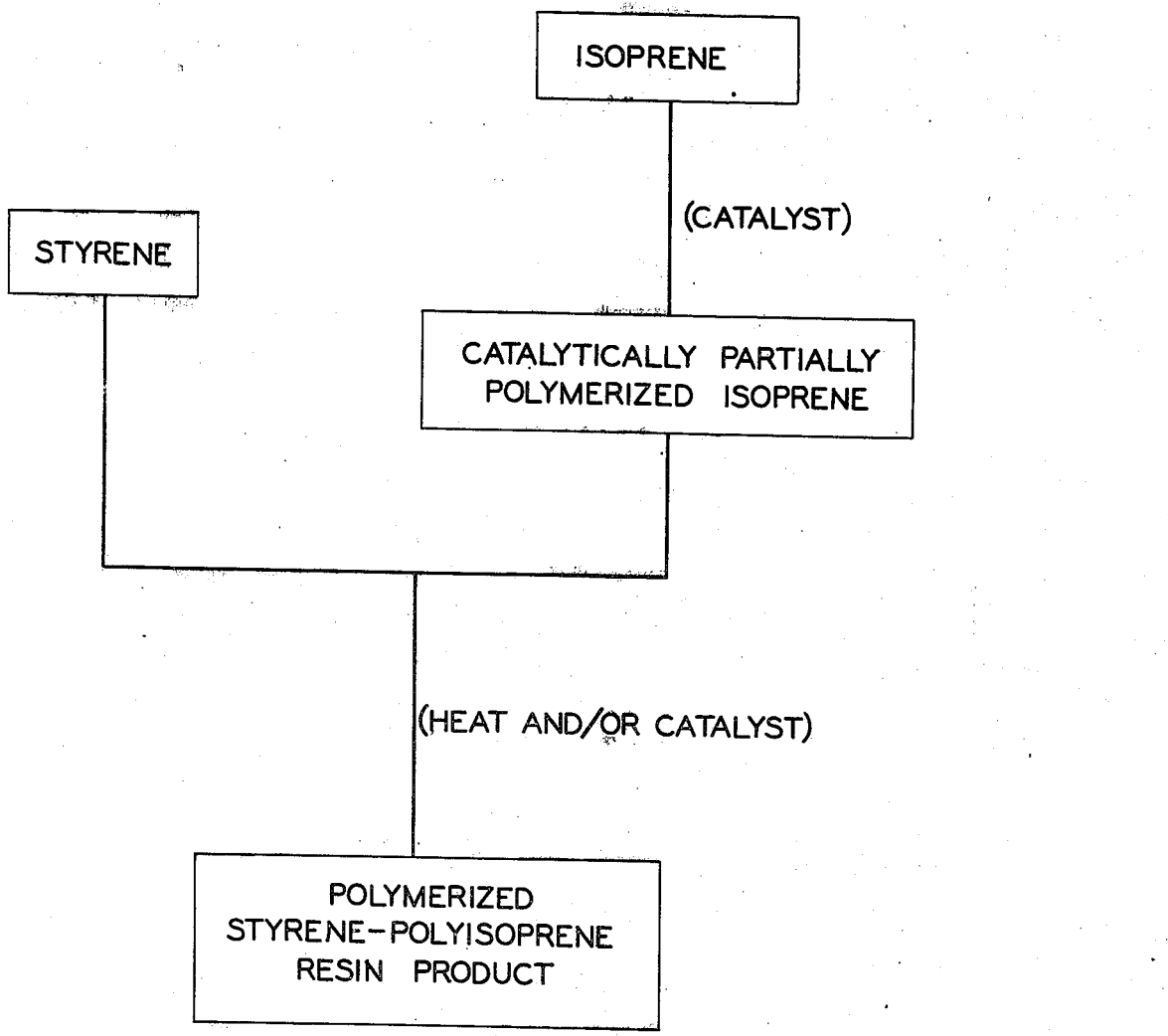

2,317,857

UNITED STATES PATENT OFFICE 2,317,857

POLYMERIZED STYRENE - POLYISOPRENE RESIN PRODUCT

Frank J. Soday, Upper Darby, Pa., assignor to The United Gas Improvement Company, a corporation of Pennsylvania Application December 17, 1938, Serial No. 246,501

20 Claims. (Cl. 260—86)

This invention relates to a new composition of matter and a method for its preparation.

More particularly, this invention pertains to resins resulting from reacting monomeric styrene with isoprene which has been partially polymerized catalytically. Such material will be referred to herein as partially polymerized isoprene.

It is an object of this invention to provide a new type of synthetic resin. It is a further object of this invention to provide resins having utility in industrial fields, and particularly in the molding and liquid coating composition fields.

More particularly, it is an object of this invention to provide varnish and lacquer resins possessing excellent alkali, acid, and water resistant properties. It is also a particular object of this invention to provide molding resins which may be used with or without plasticizing agents or lubricants. It is a further object of this invention to provide resins adapted to produce a smooth surface pleasing in appearance. A further object of the invention is to provide a molding resin with substantially non-shrinking properties.

Still another object of this invention is to provide resins the color of which may be readily controlled and varied.

A still further object of the invention is to provide resins compatible with a wide variety of additive agents such as fillers, decorative constituents, pigments, softening agents, plasticizers, and the like.

Another object of the invention is to provide a process for preparing resins of the above character.

Still other objects will become apparent to those skilled in the art from the following description and illustrative examples.

This invention is based upon the discovery that new synthetic resins having highly desirable properties may be prepared upon reacting monomeric styrene with isoprene which has been previously partially polymerized catalytically.

By partially polymerized isoprene is meant isoprene which has been subjected to catalytic polymerization conditions sufficient to change its chemical constitution from monomeric isoprene, said polymerization conditions, however, being insufficient to render the polymerized material incapable of further reaction.

The properties of the resulting resins vary somewhat with change in polymerization conditions, both with respect to the initial partial polymerization of isoprene and the subsequent polymerization of monomeric styrene and the partially polymerized isoprene.

For example, the final resins will have increasingly higher melting points with increasingly greater initial polymerization of isoprene.

Furthermore, the relative proportions of monomeric styrene and partially polymerized isoprene reflect themselves in the properties of the resultant resinous compounds to a large extent. For example, the resin resulting from reacting 60 parts of monomeric styrene with 40 parts of partially polymerized isoprene results in a resinous compound which is particularly suitable for molding or casting. On the other hand, a resin resulting from reacting 40 parts of monomeric styrene with 60 parts of partially polymerized isoprene is particularly suitable for varnish and lacquer purposes. In other words, larger proportions of monomeric styrene result in resins more particularly suited for molding and casting purposes whereas larger proportions of partially polymerized isoprene result in the production of resins more particularly suited for varnish and lacquer purposes.

Other factors which will have a modifying influence are the manner in which the initial and final polymerizations are conducted, the concentration and relative purity of the materials undergoing polymerization, the nature and quantity of catalyst employed, temperature range, reaction time, and the like.

For example, drastic conditions with respect to temperature, concentration of reactants, proportion of catalyst, and reaction time, may result in insoluble polymers or gels instead of the more desirable soluble resins.

Isoprene employed in the preparation of my new resins may be obtained from any suitable source. For instance, it may be obtained from the pyrogenic decomposition of rubber, or from fractions obtained upon the fractionation of condensates obtained in the manufacture of carburetted water gas, oil gas, refinery gas, or coke oven gas, or from similar sources. Such fractions will be referred to herein generally as light oil isoprene fractions. Fractions obtained in the manufacture of oil gas are particularly preferred.

Hydrocarbon fractions containing from 5 to 100% of isoprene may be successfully used in the production of the herein described partially polymerized isoprene, although, in general, the use of fractions containing from 50 to 100% isoprene is preferred for the production of resins of high quality.

Fractions in which isoprene is the only diolefine present are preferred, although fractions containing a lesser quantity of butadiene, cyclopentadiene or piperylene, or any combination of two or more of these, or similar materials may be employed without departing from the spirit of the invention.

The presence of olefines, such as olefines having five carbon atoms, does not detrimentally influence the reaction, but such olefines may actually take part in the reaction and become a part of the resinous product.

The accompanying drawing represents a flow sheet of my invention in its broader aspects. As clearly shown, an initial step comprises catalytically partially polymerizing isoprene. The resulting product and styrene are thereafter subjected to further polymerization employing heat and/or a catalyst to obtain a product which is my novel polymerized styrene-polyisoprene resin having very desirable characteristics for use in various arts.

INITIAL POLYMERIZATION OF ISOPRENE

The partial polymerization of isoprene is effected by means of metallic halides and particularly acid-acting metallic halide-organic solvent complexes. Examples of such catalysts are given hereinafter.

Although considerable variation is permissible when employing an acid-acting metallic halide or an acid-acting metallic halide-organic solvent complex as catalyst, the polymerizing temperature should rarely exceed 100° C., and preferably should not exceed 70° C.; the concentration of isoprene should rarely exceed 80% by weight of the total solution, and the concentration of catalyst, which is preferably uniformly distributed, should rarely exceed 10% by weight of the isoprene present, although these values are not to be considered as fixed limits.

Two or more of the foregoing catalysts might be employed.

The catalytic partial polymerization may be carried out in the liquid state or in the vapor state, or both, and in the presence or absence of solvents. The catalytic partial polymerization also may be carried out in the emulsion state.

The partial polymerization of isoprene in a light oil isoprene fraction is illustrated in the following example.

Example 1

A light oil isoprene fraction obtained in the manufacture of oil gas and containing 63.5% by weight of isoprene, 28.4% by weight of olefines, and 8.1% by weight of paraffin hydrocarbons was employed. Fifty parts by weight of this isoprene fraction was polymerized by adding it to a mixture containing approximately one part by weight of boron trifluoride-diethyl ether complex and 60 parts by weight of toluene while maintaining the temperature of this mixture within a range of 1 to 7° C., and agitating during a 6-minute period of addition. Agitation was continued at this temperature for a period of approximately 21 hours after which the catalyst was hydrolyzed by the addition of water. This was followed by approximately 30 minutes of continuous agitation after which the resultant mixture containing partially polymerized isoprene and unpolymerized constituents was dried by the addition of a small quantity of lime, with agitation, for a period of approximately 1 hour. All solid extraneous matter was thereafter removed by filtration.

The fraction containing partially polymerized isoprene, in addition to unpolymerized material, was employed in the preparation of a styrene-polyisoprene resin as will be more fully set forth hereinafter in Example 2.

On the other hand, the unpolymerized material may be wholly or partly removed prior to the final polymerization step.

The styrene employed in the production of my new resins may be obtained from any suitable source, and may be in the form of pure or commercially or technically pure styrene, or in the form of a solution or a fraction such as obtained from light oil or a mixture of light oil hydrocarbons. The source of light oil may be the same as in the case of isoprene.

Styrene fractions obtained by the distillation of light oil and having boiling ranges between 125 to 165° C. have been satisfactorily employed in the preparation of my styrene-polyisoprene resins. Resins having especially desirable properties have been obtained when employing styrene fractions having boiling ranges between 140 to 150° C. Even more desirable properties are secured in the final resins when the styrene fractions have boiling ranges between 142 to 145° C.

Accordingly, the use of substantially pure styrene is preferred when commercially feasible, particularly for resins of the molding type.

POLYMERIZATION OF STYRENE AND PARTIALLY POLYMERIZED ISOPRENE

Polymerization of monomeric styrene and partially polymerized isoprene is preferably carried out by application of heat, although the reaction may be carried out through the use of catalysts with or without the application of heat, without departing from the broad concept of the invention.

The polymerization may be carried out in the liquid state or in the vapor state, or both, and in the presence or absence of solvents. The polymerization also may be carried out in the emulsion state.

When the polymerization of styrene and partially polymerized isoprene is effected by the application of heat, a temperature between 50° to 250° C. is preferred. Temperatures between 75° and 200° C. are found to be particularly suitable.

The reaction time may be varied over very wide limits, depending upon the extent of the polymerization desired.

The following examples illustrate the formation of my new resins.

Example 2

Approximately 30 parts by weight of a styrene fraction obtained from light oil and containing approximately 65% styrene, was mixed with approximately 13 parts by weight of a partially polymerized isoprene fraction similar to that prepared by the procedure given in Example 1. This mixture was placed in a glass bomb and sealed in an atmosphere of nitrogen. The bomb was heated for a period of ten days at a temperature of approximately 100° C. Unpolymerized material was removed from the resulting mass by vaporization at a temperature of approximately 100° C. and a pressure of approximately 1.0 mm. of mercury, absolute. There was thus obtained approximately 16 parts by weight of a polymerized styrene-polyisoprene resin having properties making the resin particularly suitable for use as a molding resin.

A portion of the resin was molded at a temperature of approximately 200° C. and a pressure of 2,000 pounds per square inch. The resulting object was mottled in appearance having white and lemon-yellow colors, very beautiful in appearance. This resin was tough and hard and took a very high polish.

Example 3

A styrene-polyisoprene resin having properties making it very suitable for use in varnishes and lacquers was prepared as follows.

Approximately 9 parts by weight of a styrene fraction obtained from light oil and containing approximately 65% styrene by weight was mixed with approximately 35 parts by weight of a partially polymerized isoprene fraction containing approximately 6 parts by weight of polymer prepared as in Example 1. This mixture was placed in a glass bomb and sealed in an atmosphere of nitrogen. The bomb was heated for a period of ten days at a temperature of approximately 100° C. Unpolymerized material was removed from the resultant mass by vaporization at a temperature of approximately 100° C. and a pressure of 1.0 mm. of mercury, absolute. There was obtained a solid resin in quantity equivalent to approximately 11 parts by weight. This resin possessed excellent properties for use as a protective coating for wood, metal and similar surfaces due to its high alkali, acid and water resisting properties.

Example 4

An extremely tough molding resin of relatively high melting point was prepared as follows.

A partially polymerized isoprene fraction prepared as described in Example 1 was steam distilled to remove unpolymerized material. Ten parts by weight of this concentrated partially polymerized isoprene was mixed with approximately 90 parts by weight of substantially 100% styrene, which had been obtained by concentration of a styrene fraction secured from light oil. This mixture was placed in a glass bomb and sealed in an atmosphere of nitrogen, and heated for eight days at a temperature of approximately 100° C. followed by heating for two days at a temperature of approximately 145° C. The reactants were thus completely polymerized. The resulting resin was opaque, and resembled ivory in appearance.

This resin was found to be of very high quality for molding purposes, and was characteristic of a styrene-polyisoprene resin in which the predominant constituent is styrene.

Example 5

Another resin in which the predominant constituent was styrene, was prepared by reacting a mixture of approximately 75 parts by weight of a partially polymerized isoprene fraction and approximately 140 parts by weight of substantially 100% styrene obtained as in Example 4. The reactants were sealed in a glass bomb in an atmosphere of nitrogen and heated for 8 days at approximately 100° C. and for 2 days at approximately 145° C. Unpolymerized constituents were then removed by the procedure set forth in Examples 2 and 3. There was thus obtained approximately 130 parts by weight of a solid resin which, when molded at a temperature of approximately 185° C. and a pressure of 2,000 pounds per square inch, yielded an object resembling ivory in appearance. This object had an exceptionally smooth, hard, and tough surface and took a very high polish.

Molding resins made in accordance with my invention are characterized not only by hardness, toughness, appearance, ability to take a high polish, good molding properties, and inert characteristics, but also in imparting a warm and pleasing sensation to the touch. The latter is extremely important in the trade.

My new resins may be prepared in many desirable color combinations. Color may be obtained either naturally or artificially. Natural colors may be secured by varying the source and quality of either the styrene or the isoprene, or both. Either plain or mottled color combinations may be obtained as shown in the foregoing examples.

For example, the polymerization of a mixture containing 80 parts of monomeric styrene, in the form of a 65% light oil styrene fraction, and 20 parts of partially polymerized isoprene, in the form of a 20% solution in toluene, gave an opaque resin with a mottled yellow appearance. The mottled effect was apparently produced by the dispersion of a colorless phase in a second phase which was colored.

Resins, which are milk-white in color and which resemble ivory in appearance, may be prepared by polymerizing mixtures containing pure monomeric styrene and partially polymerized isoprene.

Artificial colors and color combinations may be produced through the addition to my new resins of suitable chemical compounds.

Coloring materials, such as organic dyes, inorganic dyes, pigments, and lakes, may be added to any one or more of the reactants, or to the reaction mixture at any stage, but preferably prior to complete polymerization.

As a rule organic dyes and other organic coloring bodies produce resins with pastel shades.

The coloring compound may, of course, be added to the unpolymerized isoprene, and may or may not be supplemented during the secondary polymerization reaction, as desired.

If desired, the coloring material itself may be prepared in situ by adding the necessary materials to the polymerization reaction.

As an example, a short list of suitable coloring materials is given in the following table.

TABLE I

| Color | Dye group |
|---|---|
| Orange | Mono azo. |
| Yellow | Mono azo. |
| Green | Triphenylmethane. |
| Heliotrope | Triphenylmethane pyronine. |
| Red | Pyronine. |
| Black | Diphenyl amine. |

Mottled effects may be obtained by adding coloring material to the polymerization mass at a stage in the polymerization reaction after which thorough stirring is no longer required.

Attention is directed to the fact that certain coloring materials may also act as catalysts or as inhibitors to the polymerization reaction. Accordingly, coloring materials should be selected as to (1) their inertness, (2) their action as catalysts, and (3) their action as inhibitors to obtain the desired result. In this connection, inhibitors may be employed to retard an otherwise too hasty reaction.

A proper choice of polymerizing conditions will enable almost any type of coloring material to be used.

In addition to coloring materials, other additives may be incorporated, such as fillers, of which asbestos, mica, wood flour, cotton linters, and fabric waste are examples.

A decorative filler functioning very much on the order of a coloring material may be added, with or without other coloring matter. Examples of decorative fillers are pearl essence and chitin extracts.

Furthermore, other agents such as mold lubricants, softeners, plasticizers, and the like, may also be added at any stage of the polymerization process.

While the use of heat as a polymerizing agent is preferred when reacting styrene with catalytically partially polymerized isoprene, other polymerizing agents may be employed if desired either with or without the application of heat.

For instance, polymerization catalysts, such as metallic halides, metallic halide-organic solvent complexes, organic peroxides, contact materials, ultra violet light, ultra sonics, mineral acids, mineral acid-organic solvent mixtures, active metals, etc., may be employed.

Examples of catalysts which may be employed in either the initial or final polymerization reaction are acid-acting metallic halides such as for example aluminum chloride, aluminum bromide, stannic chloride, boron trifluoride, boron trichloride, zinc chloride, ferric chloride, and organic solvent complexes of the foregoing metallic halides. Examples of other catalysts which may be employed in the final polymerization are pinene peroxide, benzoyl peroxide, clay, activated clay, activated carbon, activated alumina, silica gel, fuller's earth, diatomaceous earth, sulfuric acid, phosphoric acid, sulfuric acid-diethyl ether mixture, sodium and potassium.

Organic solvent complexes of the metallic halides are formed by adding the halide to the organic solvent followed by stirring. Examples of organic solvents are benzene, toluene, pentene, decene, diethyl ether, phenyl methyl ether, phenyl ethyl ether, diisopropyl ether, etc.

Metallic halide catalysts (including complexes of such metallic halides) are well-known to be distinguished as a class by their tendency to hydrolyze in the presence of water, giving and acid reaction. They are therefore frequently designated as "acid-acting metallic halides." This term includes the boron halides.

The catalyst employed in the initial reaction may be used as such or in admixture such as with a suitable solvent to form a suspension, solution or emulsion. A catalyst when employed in the final reaction may be used in similar manner.

Likewise, the reactants may be employed as such or in admixture such as with a suitable solvent, or with additives such as coloring materials etc. referred to above. The reaction also may be carried out in the emulsion state by the use of suitable emulsifying agents, such as sodium oleate.

In order to control more closely the speed and uniformity of the reaction, I prefer to slowly add with thorough agitation, a solution of the reactant or reactants to a suspension, solution or emulsion of the catalyst in an organic solvent.

Since the reaction runs smoother and is much more easily controlled under these conditions, it has been found possible to more readily effect large scale production in this manner.

Examples of suitable solvents or diluents for both catalysts and reactants are benzene, toluene, xylene, solvent naphtha, petroleum naphtha and carbon tetrachloride.

In any event, the addition of one material to the other is preferably accompanied by thorough stirring which is preferably rapid to insure uniform distribution of both materials and temperature.

In addition, the reaction is preferably carried out in apparatus capable of temperature control such as a jacketed vessel provided with an agitator.

The quantity of catalyst may be varied over a rather wide range in both the initial and the final polymerization reactions, although it is found preferable to employ limited quantities such as from 0.1% to 10% by weight of reactants present.

In general, when employing catalysts to polymerize styrene and partially polymerized isoprene, temperatures between $-60$ and $145°$ C. are suitable. I prefer, however, to use temperatures between $-40$ and $60°$ C.

The upper limit of permissible temperature is largely determined by (1) the concentration of reactants, (2) the concentration of catalyst, and (3) the reaction time employed. Therefore, if it is found that polymerization conditions are sufficiently drastic to produce an insoluble polymer or gel when a soluble polymer is desired, one or more of the four conditions, namely (1) temperature, (2) concentration of reactants, (3) proportion of catalyst, and (4) reaction time should be reduced until the desired soluble polymer is obtained.

In general, in both the initial and final polymerizations, it is preferred to completely remove catalyst from the reaction mass after the desired polymerization is obtained.

Metallic halides, metallic halide-organic solvent complexes and organic peroxides may be removed by any suitable means, such as treating the reaction mass with an alkaline solution followed by thorough washing with water.

Contact materials may be removed from the reaction mass by settling, filtration, or centrifuging, or otherwise.

While in the foregoing description reference has not been expressly made to a change in polymerization agent during any single polymerization step, it is to be understood that a change in polymerization agent during any single polymerization step might be resorted to if desired.

For instance, the initial partial polymerization of isoprene might be carried out in part by the use of a catalyst, the catalyst removed and the partial polymerization completed by the application of heat. On the other hand, heat might be applied initially followed by the use of a catalyst. The use of both heat and catalyst has already been referred to.

Likewise, the polymerization of monomeric styrene with partially polymerized isoprene might be effected in part by the use of heat and completed by the use of a catalyst, or the polymerization might be started by use of a catalyst, the catalyst removed and the polymerization completed by the use of heat. The use of heat and/or catalyst has already been referred to.

I prefer to carry out both the initial and final polymerizations in the presence of an inert and preferably non-catalytic gas, such as carbon dioxide, or nitrogen, or in the presence of solvent vapors, or vapors of the reaction mass, or in a vacuum. In general, the exclusion of air or oxygen from the material during the polymerization process will prevent any possible formation of undesirable compounds, although this step is by no means essential.

Furthermore, while it is preferred to carry out the initial catalytic partial polymerization and the final polymerization with the reactants at least for the most part in the liquid phase, it is to be understood that the reactants might be in the gaseous phase or partly in the gaseous phase and partly in the liquid phase, or one or more of the reactants might be in the form of an emulsion.

While any proportion of partially polymerized isoprene to styrene may be employed in making my new resin, I prefer in the case of coating compositions to employ between 50 and 99% partially polymerized isoprene on the undiluted basis to between 1 and 50% monomeric styrene on the undiluted basis. 60% to 90% partially polymerized isoprene to 40% to 10% monomeric styrene is very suitable.

The resin obtained by polymerizing a mixture containing 80 parts of partially polymerized isoprene to 20 parts of monomeric styrene is excellent.

On the other hand, in the case of casting or molding compositions, I prefer to employ between 50% and 99% monomeric styrene to between 50% to 1% partially polymerized isoprene on the undiluted basis. 70% to 95% monomeric styrene to 30% to 5% partially polymerized isoprene is very suitable.

The resin obtained by polymerizing a mixture containing 90 parts of monomeric styrene to 10 parts of partially polymerized isoprene is excellent.

In the event of the removal of extraneous materials, such as unpolymerized material from the partially polymerized isoprene and hydrocarbons of similar boiling point from styrene, a highly superior product is obtained even though a polymerization diluent such as benzene, toluene, etc., is employed.

While when partially polymerized isoprene is present in greater proportion in the reaction mass, the resulting resin is ideally suited to the coating of surfaces in general, such as of metal, wood, glass, ceramic substances, etc., and particularly to the coating of metal surfaces, it may be used for any other purposes, for instance, for lacquers generally, for varnishes either alone or in admixture with other resins, for enamels, for paints, for coating compositions generally, or perhaps if desired for casting and molding particularly when the spread in proportion of reactants is not too great.

While when styrene is present in larger proportion in the reaction mass, the resulting resin is ideally suited for casting or molding purposes in which it may be employed alone or in admixture with other plastics or resins either with or without the addition of coloring agents, fillers, etc., it is conceivable that, if desired, the resin might be used for coating purposes particularly if the spread in proportion of reactants is not too great.

Furthermore, while with the catalyst employed in the initial catalytic partial polymerization step and when a catalyst is employed in the final polymerization step it is preferred to have both the catalyst and the reactants in diluted form and to add the reactant solution to the diluted catalyst, it is to be understood that any other procedure might be followed without departing from the broad concept of the invention. For instance, all of the diluent may be first mixed with either the catalyst or the reactant or reactants leaving the other in concentrated form. Or the larger part of the diluent may be added to one, thus leaving the other relatively concentrated. On the other hand, both the catalyst and the reactant or reactants might be employed in concentrated form, particularly if the observations herein with respect to (1) proportion of catalyst, (2) temperature, and (3) reaction time are followed.

It will be understood that any other suitable alkali, such as sodium hydroxide, sodium carbonate, sodium bicarbonate, magnesium hydroxide, an amine or other basic substance might be substituted for lime in the removal of catalyst, preferably followed by a non-acidic drying agent such as sodium sulphate or soda lime. Both neutralizing and drying is effected by lime. Neutralization is preferably followed by filtration, centrifuging or settling to remove extraneous solids.

While I have spoken rather disparagingly of the insoluble type of resin, this is because it is also generally infusible and, therefore, has few if any important uses at the present time. Should an important use develop for a resin which is insoluble and infusible before use my process may likewise be used to obtain this material in good yield by employing drastic conditions as to (1) concentration of reactants, (2) concentration of catalyst, (3) temperature, and (4) reaction time.

It is to be understood that while it is preferred to change all or substantially all of the monomeric isoprene to partially polymerized isoprene during the initial polymerization reaction, such initial polymerization may be conducted in such a manner as to polymerize only a part of the isoprene present without departing from the spirit of the invention.

It will be understood that there may be employed not only pure and substantially pure monomeric styrene, commercial but also technical grades thereof, and any mixture or fraction in which monomeric styrene is the predominating active material of said mixture or fraction in the polymerization reaction with partially polymerized isoprene.

It will be understood that there may be employed not only pure and substantially pure monomeric isoprene, commercial but also technical grades thereof, and any mixture or fraction in which monomeric isoprene is the predominating active material of said mixture or fraction in the partial polymerization thereof.

When percentages of styrene and partially polymerized isoprene are expressly recited in the claims, these are intended to express the proportions of these specific compounds on the undiluted basis, that is irrespective of the presence of other material.

The term "acid-acting metallic halide catalyst" as used in the claims, and unless otherwise modified, is intended to include within its scope not only acid-acting metallic halides per se but also complexes thereof such as the organic solvent complexes as fully described in the foregoing specification. The term "acid-acting metallic halides" is likewise intended to include within its scope boron halides as well as complexes thereof.

It is to be understood that the above particular description is by way of illustration and that changes, omissions, additions, substitutions, and/or modifications might be made within the scope of the claims without departing from the spirit of the invention which is intended to be limited only as required by the prior art.

I claim:

1. A synthetic resin comprising the product resulting from the polymerization of styrene with isoprene which has been previously partially polymerized catalytically with the aid of an acid-acting metallic halide catalyst.

2. A synthetic resin comprising the product resulting from the polymerization of a light oil styrene fraction in which styrene is the predominating active compound with isoprene which has been previously partially polymerized catalytically with the aid of an acid-acting metallic halide catalyst.

3. A synthetic resin comprising the product resulting from the polymerization of styrene with a light oil isoprene fraction which has been previously partially polymerized catalytically with the aid of an acid-acting metallic halide catalyst, said light oil isoprene fraction prior to said partial polymerization containing more isoprene than any other diolefine.

4. A synthetic resin comprising the product resulting from the polymerization of a light oil styrene fraction in which styrene is the predominating active compound with a light oil isoprene fraction which has been previously partially polymerized catalytically with the aid of an acid-acting metallic halide catalyst, said light oil isoprene fraction prior to said partial polymerization containing more isoprene than other diolefinic material.

5. A new resinous composition for use in liquid coating compositions comprising the product of the polymerization of from 50 to 99% isoprene which has been previously partially polymerized catalytically with the aid of an acid-acting metallic halide catalyst with from 1 to 50% styrene.

6. A new resinous composition for use in molding compositions comprising the product of the polymerization of from 50 to 99% styrene with from 50 to 1% isoprene which has been previously partially polymerized catalytically with the aid of an acid-acting metallic halide catalyst.

7. A new resinous composition for use in liquid coating compositions comprising the product of the polymerization of from 60 to 90% isoprene which has been previously partially polymerized catalytically with the aid of an acid-acting metallic halide catalyst with from 40 to 10% styrene.

8. A new resinous composition for use in molding compositions comprising the product of the polymerization of from 70 to 95% styrene with from 30 to 5% isoprene which has been previously partially polymerized catalytically with the air of an acid-acting metallic halide catalyst.

9. A varnish having incorporated therein the product resulting from the polymerization of styrene with isoprene which has been previously partially polymerized catalytically with the aid of an acid-acting metallic halide catalyst.

10. A liquid coating composition comprising the product of claim 5 dissolved in a volatile solvent.

11. A molding composition comprising the product resulting from the polymerization of from 50 to 99% highly concentrated styrene with from 1 to 50% isoprene which has been previously partially polymerized catalytically with the aid of an acid-acting metallic halide catalyst.

12. A molding composition comprising the product resulting from the polymerization of from 50 to 99% highly concentrated styrene with from 1 to 50% highly concentrated isoprene which has been previously partially polymerized catalytically with the aid of an acid-acting metallic halide catalyst.

13. A process comprising polymerizing styrene with isoprene which has been previously partially polymerized catalytically with the aid of an acid-acting metallic halide catalyst.

14. A process comprising heat polymerizing styrene with isoprene which has been previously partially polymerized catalytically with the aid of an acid-acting metallic halide catalyst.

15. A process comprising polymerizing a light oil styrene fraction in which styrene is the predominating active compound and obtained in the manufacture of oil gas with a light oil isoprene fraction which has been previously partially polymerized catalytically with the aid of an acid-acting metallic halide catalyst, said light oil isoprene fraction having been obtained in the manufacture of oil gas and prior to said partial polymerization having contained more isoprene than other diolefinic material.

16. A synthetic resin comprising the product resulting from the heat polymerization of monomeric styrene with isoprene which has been previously partially polymerized catalytically with the aid of an acid-acting metallic halide catalyst.

17. A new resinous composition comprising the thermoplastic product resulting from the heat polymerization of from 60 to 90% isoprene which has been previously partially polymerized catalytically with the aid of an acid-acting metallic halide catalyst with from 40 to 10% monomeric styrene.

18. A new resinous composition comprising the thermoplastic product resulting from the heat polymerization of from 70 to 95% monomeric styrene with from 30 to 5% isoprene which has been previously partially polymerized catalytically with the aid of an acid-acting metallic halide catalyst.

19. A process for the copolymerization of styrene and a light oil isoprene fraction at least 50% in isoprene concentration, comprising subjecting said light oil isoprene fraction to polymerizing conditions in the presence of an acid-acting metallic halide catalyst while maintaining the temperature throughout the reaction mass not in excess of 100° C., the concentration of isoprene not in excess of 80% by weight, and the proportion of catalyst to isoprene not in excess of 10% by weight, stopping the foregoing reaction while said isoprene is still in a partially polymerized state, admixing resulting partially polymerized isoprene and monomeric styrene, and subjecting the resulting admixture to polymerizing conditions to produce a thermoplastic synthetic resin.

20. The product of the process of claim 19.

FRANK J. SODAY.